United States Patent

[11] 3,615,197

[72] Inventor Walter Jaeger
    Stroudsburg, Pa.
[21] Appl. No. 816,687
[22] Filed Apr. 16, 1969
[45] Patented Oct. 26, 1971
[73] Assignee Ovitron Corporation
    Newburgh, N.Y.

[54] PROCESS FOR THE PRODUCTION OF SULFUR TRIOXIDE
    5 Claims, 4 Drawing Figs.
[52] U.S. Cl. .................................................. 23/176,
                                                            23/168
[51] Int. Cl. ........................................... C01b 17/68,
                                                       C01b 17/76
[50] Field of Search .................................... 23/168,
                                                    174, 175, 176

[56] References Cited
    FOREIGN PATENTS
1,120,232  7/1968  England .................... 23/168
1,381,578  11/1964 France ...................... 23/175

OTHER REFERENCES
Perry, Chem. Engrs. Handbook, sect 10, pp. 8–10, 26, 27; sect 11, p. 17 (4ed McGraw-Hill 1963)
Duecker, The Manufacture of Sulfuric Acid, pp. 160–164 (Reinhold 1959)

Primary Examiner—Oscar R. Vertiz
Assistant Examiner—Charles B. Rodman
Attorney—Sandoe, Hopgood and Calimafde ABSTRACT: Sulfur trioxide is produced by burning elemental sulfur to sulfur dioxide which is cooled to a kindling or ignition temperature by indirect heat exchange in a waste heat boiler at which temperature the sulfur dioxide is partially catalytically oxidized to sulfur trioxide by passing it through a first group of catalytic converters following which it is then cooled and removed from the gas stream in an intermediate absorber. The remaining tail gas from the absorber is reheated by means of heat exchangers serially connected to the first group of converters and the thus-heated tail gas then finally converted in a last stage catalytic converter to sulfur trioxide which is recovered in a second absorber, this process being known as the double absorption process.

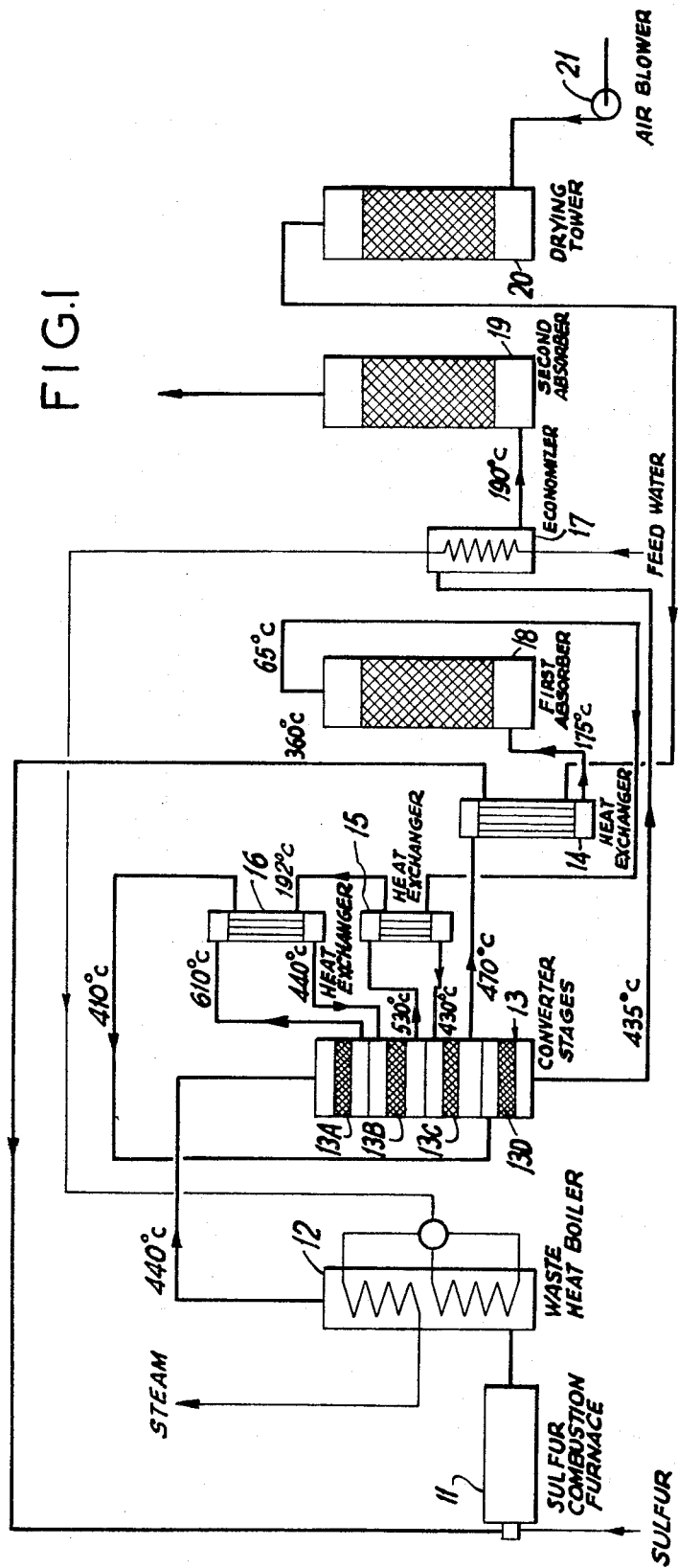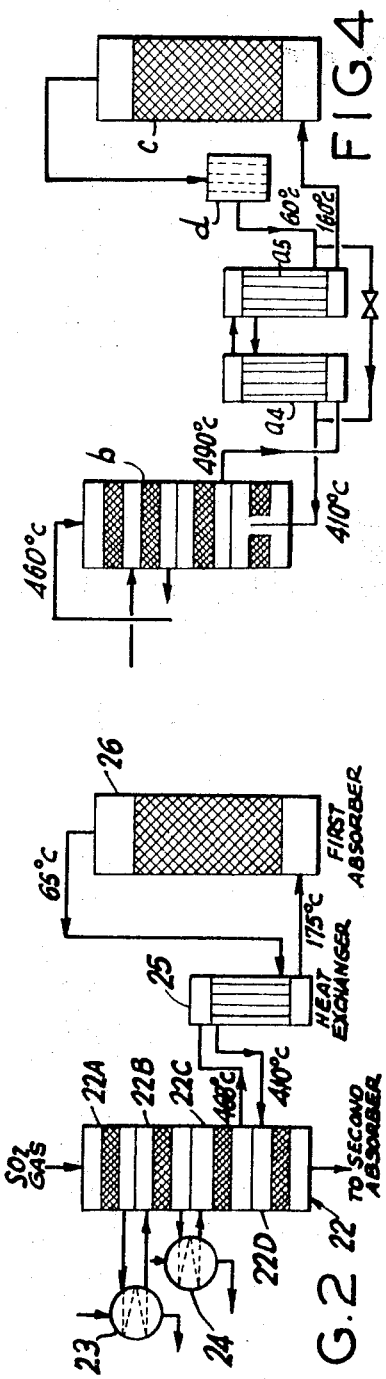
FIG.1
FIG.2
FIG.4
INVENTOR.
WALTER JAEGER

PROCESS FOR THE PRODUCTION OF SULFUR TRIOXIDE

This invention relates to a process for converting sulfur dioxide to sulfur trioxide in the production of sulfuric acid and, in particular, to a process for providing high conversion efficiency while employing minimum heat exchanger surfaces for controlling the kindling or ignition temperature of sulfur dioxide between catalytic conversion stages.

Numerous processes have been proposed for the production of sulfuric acid by the oxidation of elemental sulfur to form sulfur dioxide which, after cooling to the proper kindling temperature, is catalytically oxidized to sulfur trioxide, the sulfur trioxide being thereafter absorbed in concentrated sulfuric acid to form further sulfuric acid. Processes which have recently received particular attention comprise partially oxidizing the sulfur dioxide to sulfur trioxide, removing the trioxide by a first absorption step, reoxidizing the tail gas followed by removing the additionally formed sulfur trioxide in a second absorption step. This process is referred to in the trade as the double absorption process and is employed to attain maximum conversion with minimum sulfur dioxide introduced into the surrounding environment with the stack gases. Thus, the process has particular importance in minimizing air pollution.

Several of the known processes differ usually in the type of reheating employed on the tail gases leaving the first absorber. It is known, for example, to employ the flow from an intermediate converter stage (heated oxidized gas) to reheat the tail gas coming from the first absorption tower for oxidation in the next or last catalytic stage, the oxidized gas from the intermediate converter being in turn cooled to the proper ignition temperature prior to introduction into the next intermediate converter stage, if necessary. The oxidation of sulfur dioxide to sulfur trioxide is an exothermic reaction and, since heat is generated, with an attendant rise in temperature, it is necessary that the partially oxidized gas be cooled to its proper kindling temperature before it is introduced to the next converter stage. This is accomplished by means of heat exchangers. A problem that arises in this regard is that a small log mean temperature difference (to be discussed later) in the heat exchanger units generally requires the use of large heat exchanger surfaces which places economic limitations on the design of sulfur acid plants using such processes.

In another proposed process, the tail gas coming from the first absorber of a double absorption system is reheated to the kindling temperature of the catalyst by heat exchange with hot sulfur dioxide gas (e.g., following oxidation of elemental sulfur) after the hot gas has given up some of its heat in a waste heat boiler. Generally speaking, the hot gas emanates from the waste heat boiler at a relatively high temperature, for example 705° C., which gas must then be cooled (by heat exchange with cool gas) to a kindling temperature of about 420° C. before it enters the first of a group of serially connected catalytic converter stages. However, because of the relatively high temperature of the gas emanating from the waste heat boiler (705° C.) and the attendant large log mean temperature difference which results in the use of a relatively small heat exchange unit disposed after the waste heater boiler, rather highly alloyed heat resistant metals have to be employed in place of the standard boiler steel materials. As such metals are expensive, the resulting costs offset the price advantage which generally accrues from the use of smaller heat exchange equipment.

Other processes are known in which the reheating of the tail gases from the first absorption tower is effected through the use of externally applied heat, such as superheated steam or by the use of an oil-fired reheater. A disadvantage of such processes is the additional cost of heat energy. As illustrative of various processes which have been proposed in overcoming some of the aforementioned problems, reference is made to U.S. Pat. No. 3,142,536, No. 3,259,459, No. 3,404,955 and No. 3,404,956, and also to page 459, Vol. 15, of Ullmann's *Encyklopaedie der Technischen Chemie* (1964).

It is thus an object of this invention to provide an economic process for the conversion of sulfur dioxide to sulfur trioxide, whereby high conversion yields of upwards of 99 percent and higher are obtained.

Another object is to provide a process for the production of sulfur trioxide in which improved heat economy is effected.

A still further object is to overcome the inherent disadvantages of prior methods employed in the conversion of sulfur dioxide to sulfur trioxide.

These and other objects will more clearly appear when taken in conjunction with the following disclosure and the accompanying drawing, wherein:

FIG. 1 illustrates diagrammatically the apparatus employed in carrying out one embodiment of the invention;

FIG. 2 depicts diagrammatically a portion of an apparatus with which the improvement of the invention is compared by means of heat balance calculations;

FIG. 4 illustrates a prior system utilizing two series connected heat exchangers after the third stage, the heat exchangers providing a low log mean temperature difference.

Figure 3:
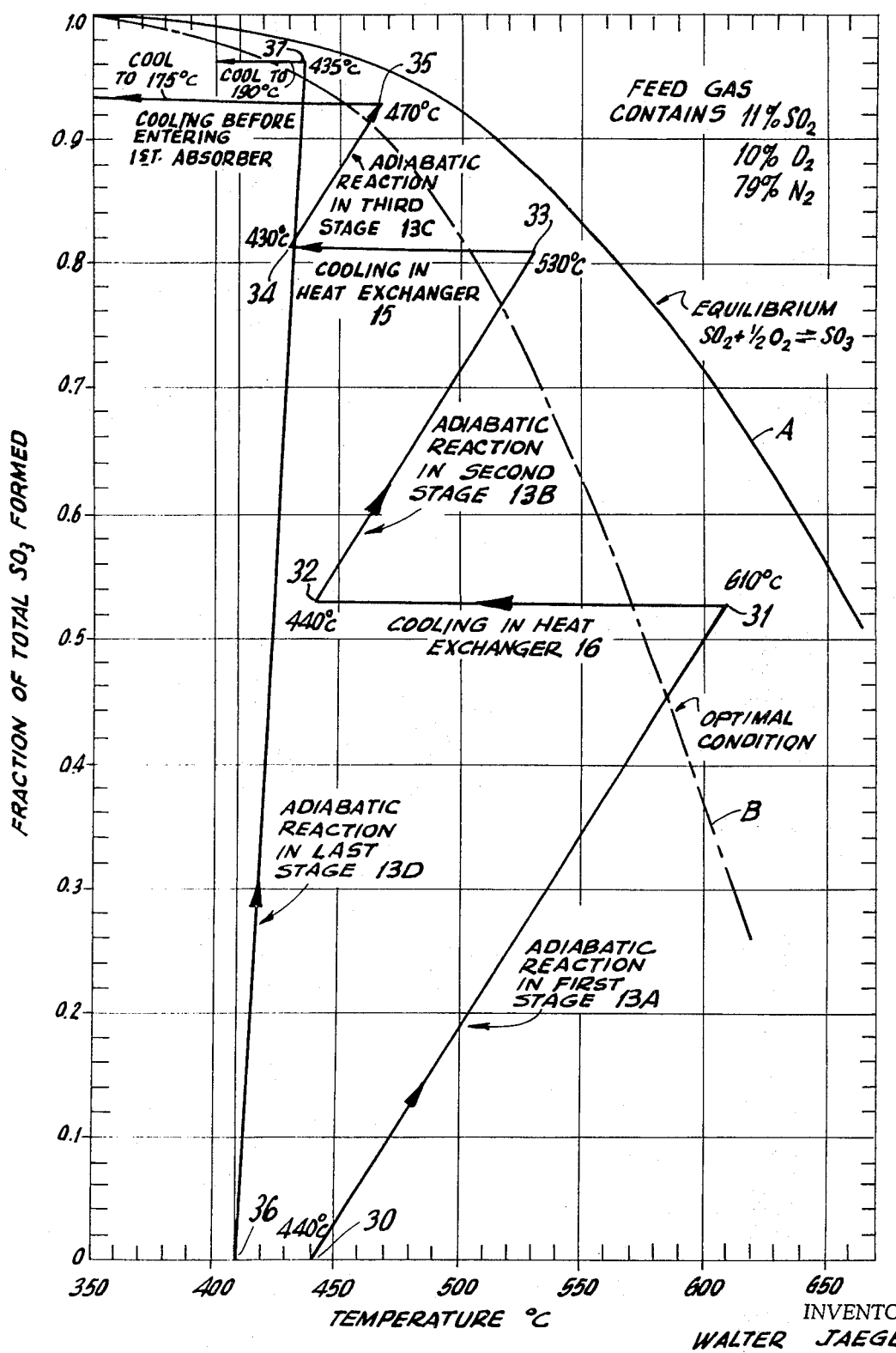
FIG. 3 is a plot showing conversion efficiency as a function of temperature employing a feed gas to the first converter stage containing about 11 percent $SO_2$, 10 percent $O_2$ and 79 percent $N_2$.

Stating it broadly, the invention is particularly applicable to the production of sulfuric acid from the combustion of elemental sulfur. Sulfur is oxidized to $SO_2$ by burning it with air to produce a gas mixture containing about 10 to 12 percent $SO_2$, 10 to 12 percent oxygen and the balance substantially nitrogen. Thus, where the $SO_2$ is about 10 percent, the oxygen will be about 11 percent; when the $SO_2$ is about 11 percent, the oxygen will be about 10 percent; and when the $SO_2$ is about 12 percent, the oxygen will generally be about 9 percent. In other words, the nitrogen content of the resulting gas will usually be in the neighborhood of 79 percent.

The equipment will generally comprise a sulfur combustion furnace; a waste heat boiler coupled by appropriate means to the furnace for utilizing the heat of the combusted gas; a group of serially connected catalytic oxidation converters; heat exchangers serially connected to certain of the converter stages for removing excess heat from the partially oxidized gas for use in heating the recycled tail gas; a first absorber in which the initially partially oxidized gas is absorbed and the tail gas which remains recycled to succeeding converter stages for further oxidation to sulfur trioxide and a second absorber for absorbing the additionally formed sulfur trioxide.

It has been found that by using the reaction heat of the first two converter stages to heat the tail gas from the first absorber, a twofold advantage is achieved. First, it is achieved with respect to heat economy and, second, because of a larger log mean temperature difference, a reduction in the effective size of the heat exchangers is obtained without requiring the use of high temperature alloys in the construction thereof.

In its broad aspects, the improvement comprises utilizing the heat of oxidation of the partially oxidized hot gas from the initial converter stages (for example, the first and second converter stages) to heat the cold tail gas from the first absorber while maintaining a large log mean temperature difference between the hot gas and the cold gas during the heat exchange. The steps include cooling the partially oxidized hot gas to its kindling temperature and passing it through the succeeding converter stages for further oxidation, the further partially oxidized hot gas being again cooled and passed through the first absorber. The cold tail gas is then removed from the first absorber and heated to its kindling temperature by passing it in countercurrent and heat exchange relationship to the hot gas, the heated tail gas being then passed through the last converter stage for final conversion to $SO_3$ which is then recovered in the second absorber.

The advantages of the invention will be understood in the context of the flow diagram of FIG. 1, it being understood that the embodiment shown therein is only by way of illustration and not by way of limitation, since variations and modifications may be resorted to, for example, in the temperatures stated, without departing from the spirit and scope of the claimed invention, as those skilled in the art will readily understand.

Thus, referring to FIG. 1, a sulfur combustion furnace 11 is shown which is controlled to burn sulfur and produce a gas containing about 11 percent $SO_2$, about 10 percent $O_2$ and about 79 percent $N_2$. The hot gas leaves the furnace at a temperature of about 1,280° C. and enters waste heat boiler 12 and gives up a substantial amount of heat for steam generation, following which the gas leaves the furnace at a temperature of about 440° C. The gas then enters a group 13 of serially connected catalytic converter stages 13A to 13D, the gas entering the first stage 13A from which it exits at a higher temperature of about 610° C. due to the heat of reaction resulting from the oxidation of some of the sulfur dioxide to sulfur trioxide. Since the gas must be cooled before it enters the second stage in order to achieve optimum oxidation according to the equilibrium of the reaction, it is passed through heat exchanger 16 where it is cooled to about 440° C. before it enters second stage 13B. The gas is further oxidized in the second converter stage 13B and leaves this stage at a temperature of about 530° C. and enters heat exchanger 15 at this temperature where it is cooled to about 430° C., following which it flows into third converter stage 13C and further oxidized. This gas is then passed through heat exchanger 14 which is used to preheat air from drying tower 20 (fed by air blower 21) to 360° C., the partially oxidized gas being now cooled to 175° C., at which temperature it enters the first absorber 18 in which the sulfur trioxide is separated, with the resulting tail gas then leaving the first absorber at a temperature of about 65°C.

The tail gas at this temperature is recycled for further oxidation by passing it about 63° C. through serially connected heat exchangers 15 and 16 for reheating to 410° C. by indirect heat exchange with the hot reacted gas from the first and second stage converters 13A and 13B, following which the reheated gas enters the fourth and last stage 13D for substantially complete conversion to sulfur trioxide. The converted gas leaves the last converter stage at a temperature of about 435° C. and is cooled as it passes through economizer 17 for preheating the feed water to waste heat boiler 12. The gas is cooled by the economizer to about 190° C. and then introduced into the second absorber 19 where the sulfur trioxide is recovered as sulfuric acid.

By utilizing the foregoing embodiment, a total conversion of cover 99 percent, for example, over about 99.5 percent, is achieved. This will be appreciated from the following:

The temperature at which the sulfur dioxide is catalytically oxidized depends upon the ignition temperature of the catalyst employed. It is known that the conversion equilibrium for the production of sulfur trioxide is favored by lowering the temperature. On the other hand, the reaction rate is favored by increasing the temperature. Since these factors tend to complete against each other, most commercial processes are designed to use catalyst beds of, for example, vanadium pentoxide, utilizing ignition temperatures ranging from about 460° C. in the first stage to about 400° C. in the last stage.

As illustrative of the steady state conditions which may prevail in the system employing a feed gas of about 11 percent $SO_2$, about 10 percent $O_2$ is oxidized to $SO_3$. However, to achieve true equilibrium would generally require an inordinate amount of catalyst which places an economic limitation on the process. However, by working with optimal curve B, it is possible to employ a minimum amount of catalyst consistent with obtaining optimum yield for that catalyst. Thus, starting with an ignition temperature of 440° C. in the first converter stage 13A beginning at 30 in FIG. 3, the reaction proceeds with a rise in temperature to 610° C. at 31 at which a conversion of 53 percent (0.53 fraction) is obtained. The gas is removed from the first stage and cooled by means of heat exchanger 16 to an ignition temperature of 440° C. as indicated at 32 in FIG. 3. Following the cooling, the cooled gas is then fed to the second converter stage 13B where the reaction further proceeds to a conversion temperature of 530° C. at 33, at which an accumulated conversion of 81 percent is obtained, following which the hot gas is cooled to 430° C. at 34 in heat exchanger 15 preparatory to being fed to the third stage where it is heated to 470° C. at 35 to provide an accumulated conversion efficiency of about 93 percent. The reacted gas leaving the third stage is then cooled to 175° C. before entering the first or intermediate absorber 18 (FIG. 1).

The tail gas which remained, after the 93 percent converted gas passed through the first absorber, was then heated to 410° C. by passing it through heat exchangers 15 and 16 following which it was fed to the last converter stage 13D (note numerals 36 and 37 in FIG. 3) where 96 percent of the $SO_2$ in the tail gas was converted to $SO_3$. Since 7 percent of the original $SO_2$ was in the tail gas, the additional amount recovered is 6.7 percent (7×0.96) which, added to the 93 percent recovered, provides a total yield of 99.7 percent.

As has been stated hereinbefore, such high recoveries have the added advantage in that relatively clean stack gases are obtained low in sulfur, for example, as low as below 400 parts per million. It is not uncommon in the more conventional sulfuric acid plants to have stack gases containing 3,000 to 5,000 parts of sulfur dioxide per million parts of gas in a single absorption process utilizing three converter stages and an efficient catalyst. In plants using four converter stages and an efficient catalyst, the sulfur dioxide in the stack gases may range from about 1,800 to 2,000 parts per million.

I have found that by utilizing the reaction heat of the first two stages in combination with the indirect heat exchange effect of the tail gas from the first absorber, I obtain a large log mean temperature difference which results in the use of much less heat exchanger surface using ordinary standard boiler steel. The meaning of the log mean temperature difference will be apparent from the following discussion.

Referring to the system of FIG. 2, the partially reacted gas (hot gas) leaves the converter third stage at a temperature of about 468° C. and enters heat exchanger 25 where it gives up some of its heat to the tail gas (cooling gas) emanating from the first or intermediate absorber 26. The partially reacted or hot gas is thus cooled to 175° C. before it enters the absorber, while the tail (or cooling) gas leaving absorber 26 at 65° C. is heated to 410° C., at which temperature it enters the last converter stage.

As stated hereinbefore, the log mean temperature difference is employed in determining the heat exchanger surface face to be utilized in a system involving heat transfer. An equation employed in determining the heating and cooling capacity of a heat exchanger system is as follows:

$$A = \frac{Q}{K \times \Delta Tm} \qquad (1)$$

where
$A$ is the surface area of the heat exchanger system
$Q$ is the heat involved in the heat exchanger system
$K$ is the overall heat transfer coefficient expressible as B.t.u./hour/sq. ft/° F. or as Kcal./hr./M²/°C.
$\Delta Tm$ is the log mean temperature difference. The mean of the terminal temperature difference, $\Delta Tm$, is defined as the mean of the terminal temperature differences between hot and cold fluid entering and leaving the heat exchanger, the difference being determined as follows:

$$\Delta Tm = \frac{(T_2 - T_3) - (T_1 - T_4)}{2.3 \log \frac{(T_2 - T_3)}{(T_1 - T_4)}}$$

where
$\Delta Tm$ is the log mean temperature difference
$T_1$ is the temperature of the hot fluid entering the heat exchanger
$T_2$ is the temperature of the cooled hot fluid leaving the heat exchanger
$T_3$ is the temperature of the cooling fluid entering the heat exchanger $T_4$ is the temperature of the heated cooling fluid leaving the heat exchanger.

Applying the equation to the system of FIG. 2, the following is obtained:

$$\Delta Tm = \frac{(175-65)-(468-410)}{2.3 \log \frac{(175-65)}{(468-410)}}$$

or $$\Delta Tm = \frac{110-58}{2.3 \log \frac{110}{58}} = 81° C. \quad (3)$$

Referring now to the embodiment of the invention as illustrated in FIG. 1 and assuming substantially the same heat capacity as in the system of FIG. 2 and substantially the same overall heat transfer coefficient, the log mean temperature different is obtained in two steps as follows, since serially connected heat exchangers 15 and 16 are involved:

Heat Exchanger 16

$$\Delta Tm-1 = \frac{(440-192)-(610-411)}{2.3 \log \frac{(440-192)}{(610-411)}}$$

$$\Delta Tm-1 = \frac{248-199}{2.3 \log \frac{248}{199}} = 222° C. \quad (4)$$

Heat Exchanger 15

$$\Delta Tm-2 = \frac{(430-63)-(530-192)}{2.3 \log \frac{(430-63)}{(530-192)}}$$

$$\Delta Tm-2 = \frac{367-338}{2.3 \log \frac{367}{338}} = 350° C. \quad (5)$$

The contributing portion of each of the heat exchangers to the net log mean temperature difference is determined in accordance with the temperature drop of the hot gas in each heat exchanger as follows:

Temperature drop of
the hot gas in Heat
Exchanger 16 — 610° C. −440° C.=170° C.  (6)
Temperature drop of
the hot gas in Heat
Exchanger 15 — 530° C. −430° C.=100° C.  (7)
Total temperature
drop attributed to
Heat Exchangers 15
and 16 — 270° C.  (8)
Proportion of total
temperature drop attributed to Heat
Exchanger 16 — 170/270=0.63  (9)
Proportion of total
temperature drop
attributed to Heat
Exchanger 15 — 100/270=0.37  (10)
Log mean temperature difference of
system — (0.37×350+0.63×222/1=269° C.  (11)

Comparing the log mean temperature of the system of FIG. 2 calculated in (3), namely 81° C., with the system of FIG. 1 calculated in (11), namely 269° C., it will be noted that a much higher log mean temperature difference is obtained with the system of the invention. This has particular advantage with respect to the area of heat exchanger surfaces as follows:

The area of heat exchanger surfaces for each of the aforementioned systems (FIGS. 1 and 2) is determined in accordance with the equation referred to hereinabove as follows:

$$A = \frac{Q}{Kx\Delta Tm} \quad (1)$$

The comparison is made under optimum conditions for each in which $Q$ and $D$ are assumed to be substantially the same for both systems. Thus, for the system of the invention illustrated in FIG. 1, $$A_1 \alpha \frac{1}{\Delta Tm_a} \quad (12)$$

and for the prior system of FIg. 2, $$A_2 \alpha \frac{1}{\Delta Tm_b} \quad (13)$$

Substituting 269° C. for $\Delta Tm_a$ and 81° C. for $\Delta Tm_b$ and forming a ration between (12) and (13), and the following is obtained:

$$\frac{A_1}{A_2} = \frac{\frac{1}{269}}{\frac{1}{81}} = \frac{81}{269} = \frac{1}{3.3} \quad (14)$$

It is apparent from the answer of (14) that area $A_2$ of the heat exchanger in FIG. 2 is 3.3 times greater than the total area $A_1$ for the two heat exchangers of FIG. 1. In other words, the system of the invention has 70 percent less heat exchanger surface than that of FIG. 2. The larger area is necessary in the system of FIG. 2 due to the lower log mean temperature difference. The much smaller area in the system of FIG. 1 (70 percent smaller) is advantageous in that it results in lower capital cost in equipment. An additional advantage is that the system of FIG. 1 is designed for standard boiler steel which is more economical than the more expensive special heat resistant alloys. In addition, a process is provided in which the final effluent gas leaving the last absorber is sufficiently clean of sulfur to meet newly imposed legislative standards. For example, a feed gas containing 11 percent sulfur dioxide can be substantially converted to sulfur trioxide with a yield of 99.5 to 99.8 percent so that the amount of sulfur dioxide remaining in the tail gas may range from approximately 0.02 to 0.05 percent or range up to about 500 parts per million parts of gas which is substantially below the amounts (e.g. 3,000 to 5,000 parts per million) which prevail in the more conventional systems.

Referring to the double absorption system shown on page 459, Vol. 15, of Ullmann's Encyklopaedie der Technischen Chemie (1964), a pertinent fragment of which is reproduced as FIG. 4 herein, hot gas from the third stage of converter $b$ at a temperature of about 490° C. is passed through serially connected heat exchangers $a_1$ and $a_5$ where it is cooled to 160° C. before entering absorber $c$. The tail gas leaving the absorber then passes through a cooler $d$ where it is cooled to 60° C., the tail gas being thereafter heated to 410° C. by passing it countercurrently through heat exchangers $a_5$ and $a_4$ and then into the last stage of the converter as shown. As will be noted, the hot gas from the third stage is cooled to 160° C., while the cool tail gas is heated from 60° C. to 410°C. The log mean temperature difference using formula (2) herein calculates to 89.5 for the system of FIG. 4 as compared to 269° C. for the system of the invention of FIG. 1. Based on the ratios of these two temperatures, the system of FIG. 4 requires the use of three times more heat exchanger surface coupled to the third stage than applicant employs in the first three stages of FIG. 1. Putting it another way, the system of FIG. 1 employs about 67 percent less heat exchanger surface coupled to the third stage than applicant than the system of FIG. 4.

Generally speaking, the log mean temperature difference obtainable in accordance with the invention is at least about 200° C. and, more advantageously, at least about 230° C. and higher.

With log mean temperature differences of over 200° C., the amount of heat exchanger surface serially connected after the first two stages is generally at least 25 percent less than the area obtainable with prior systems. At log mean temperature differences of at least 230 ° C. and over, the amount of heat exchanger surface serially connected after the first two stages is generally at least 40 percent less than the area obtainable with prior systems.

Summarizing the systems of the type illustrated in FIG, 1 elemental sulfur is burned to provide a hot combusted gas at a temperature of about 1,180° C. to 1,350 C. containing about 10 percent to 12 percent sulfur, about 11 percent to 9 percent oxygen and the balance substantially nitrogen. The hot gas is passed through waste heat boiler 12 where it is cooled to a kindling temperature ranging from about 420° C. to 460° C., following which it is passed through the first stage 13A of a four-stage catalytic converter in which the gas is partially oxidized to sulfur trioxide and reaches a reaction temperature ranging from about 590° C. to 620° C. The hot partially oxidized gas is passed through heat exchanger 16 serially connected between the first and second stage converters 13A, 13B, and the gas cooled to a kindling temperature of between about 430° C. and 460° C. before it enters the second stage converter. The gas is further converted to sulfur trioxide in second stage converter 13B where it reaches a reaction temperature of about 510° C. to 540° C., at which temperature it enters the second heat exchanger 15 serially connected between the second and third stage converters 13B and 13C. The hot gas is cooled in the second heat exchanger to a temperature of about 420° C. to 440° C. at which temperature it enters third stage 13C where it is further oxidized and reaches a reaction temperature of about 455° C. to 480° C., following which it is passed through heat exchanger 14 where it is cooled to a temperature of about 150° C. to 220 ° C. prior to entering the first or intermediate absorber 18. The sulfur trioxide is absorbed and the tail gas removed from the absorber at a temperature of about 60° C. to 90° C. and recycled for final reaction in the last stage converter 13D, the recycled tail gas passing through serially connected heat exchangers 15 and 16 where it is heated to about 180° C. to 220° C. in heat exchanger 15 and then to a kindling temperature of about 400° C. to 430° C. in heat exchanger 16, while cooling the hot gases from the first and second stage converters. The heated tail gas is then passed through the fourth or last stage converter and leaves it at a temperature of about 420° C. to 440° C., the reacted gas being then passed through economizer 17 or other suitable exchanger for cooling down to 170° C. to 220° C. prior to entering second absorber 19, the tail gas being thereafter discarded into the environment.

Although the present invention has been described in conjunction with preferred embodiments, it is to be understood that modifications and variations may be restored to without departing from the spirit and scope of the invention as those skilled in the art will readily understand. Such modifications and variations are considered to be within the purview and scope of the invention and the appended claims.

What is claimed is:

1. In a process for producing sulfur trioxide for conversion into sulfuric acid by double absorption utilizing a group of series connected catalytic converter stages and a first and second absorber, wherein $SO_2$-containing gas is partially oxidized to $SO_3$ in the initial converter stages of the series to form a hot gas and the $SO_3$ removed in the first absorber, and wherein cold tail gas from the first absorber is reheated and reoxidized in the last converter stage to $SO_3$ which is recovered in the second absorber, the improvement which comprises, utilizing the heat of oxidation of the partially oxidized hot gas from the initial converter stages to heat the cold tail gas, while maintaining a large log mean temperature difference of at least about 200° C. between the hot gas and the cold gas during the heat exchange, the steps comprising cooling the partially oxidized hot gas to its optimum oxidation temperature and passing it through the succeeding converter stages for further oxidation, the further partially oxidized hot gas being again cooled and passed through the first absorber, and removing cold tail gas from the first absorber and heating to its kindling temperature by passing it in countercurrent and heat exchange relationship to the hot gas, the heated tail gas being then passed through the last converter stage for final conversion to $SO_3$ which is then recovered in the second absorber.

2. In a process for producing sulfur trioxide for conversion into sulfuric acid by double absorption utilizing a group of at least four series connected catalytic converter stages and a first and second absorber wherein $SO_2$-containing gas is partially oxidized to $SO_3$ in the first three stages to form a hot gas and the $SO_3$ removed in the first absorber, and wherein cold tail gas from the first absorber is reheated and reoxidized in the last converter stage to $SO_3$ which is recovered in the second absorber, the improvement which comprises, utilizing the heat of oxidation of the hot gases from the first two stages to heat the cold tail gas, while maintaining a large log mean temperature difference between the hot gas and the cold gas of at least about 200° C., the steps comprising passing the oxidized hot gas from the first converter stage through a serially connected first heat exchanger where the hot gas is cooled to its optimum oxidation temperature, passing the cooled oxidized gas through the second converter stage for further oxidation and from there through a second serially connected heat exchanger where the hot gas is again cooled to its optimum oxidation temperature, the combined effect of the two heat exchangers providing a log mean temperature difference of at least 200° C., further oxidizing the gas by passing it through the third converter stage, the hot gas leaving the third stage being then cooled and passed through the first absorber, and removing cold tail gas from the first absorber and heating it to its kindling temperature by passing it countercurrently and successively through the second and first heat exchangers, the heated tail gas being then passed through the last converter stage for final conversion to $SO_3$ which is then recovered in the second absorber.

0. The process of claim 2, wherein the log mean temperature difference of the hot and cold gas entering and leaving the first and second heat exchangers is at least about 230° C.

4. In a process for producing sulfur trioxide for conversion into sulfuric acid by double absorption by burning elemental sulfur to produce a gas containing about 10 percent to 12 percent $SO_2$ about 9 percent to 11 $O_2$ and the balance substantially nitrogen by utilizing a group of at least four series connected catalytic converter stages and a first and second absorber, wherein the $SO_2$-containing gas is partially oxidized to $SO_3$ in the first three stages to form a hot gas and the $SO_3$ removed in the first absorber, and wherein cold tail gas from the first absorber is reheated and reoxidized in the last converter stage to $SO_3$ which is recovered in the second absorber, the improvement which comprises, utilizing the heat of oxidation of the hot gases from the first two stages to heat the cold tail gas, while maintaining a large log mean temperature difference of at least about 200° C. between the hot gas and the cold gas, the steps comprising passing the oxidized hot gas from the first converter stage at a temperature of about 590° C. to 620° C. through a serially connected first heat exchanger where the hot gas is cooled to a optimum oxidation temperature of about 430° C. to 460° C., passing the cooled oxidized gas through the second converter stage for further oxidation to a temperature of about 510° C. to 540° C. and from there through a second serially connected heat exchanger where the hot gas is cooled to an optimum oxidation temperature of about 420° C. to 440° C., the combined effect of the two heat exchangers providing a log mean temperature difference of at least about 200° C., further oxidizing the gas to a temperature of about 455° C. to 480° C. by passing it through the third converter stage, the hot gas leaving the third stage being then cooled to a temperature of about 150° C. to 220° C. and passed through the first absorber, and removing cold tail gas from the first absorber at a temperature of about 60° C. to 90° C. and heating it to its kindling temperature of about 400° C. to 430° C. by passing it countercurrently and successively through the second and first heat exchangers, the heated tail gas being then passed through the last converter stage for final conversion to $SO_3$ which is then recovered in the second absorber.

5. The process of claim 4 wherein the log mean temperature difference of the hot and cold gas entering and leaving the first and second heat exchangers is at least about 230° C.